United States Patent
Matsumoto

[19]

[11] Patent Number: 6,140,615
[45] Date of Patent: Oct. 31, 2000

[54] HEATER APPARATUS FOR AN AQUARIUM

[75] Inventor: Masahide Matsumoto, Tokyo, Japan

[73] Assignee: Sanki Consys Co., Ltd., Tokyo, Japan

[21] Appl. No.: 09/229,963

[22] Filed: Jan. 14, 1999

[51] Int. Cl.[7] .................................................. F27D 11/00
[52] U.S. Cl. ........................... 219/441; 219/523; 392/444
[58] Field of Search ........................................ 219/438, 439, 219/440, 441, 442, 497, 523, 528, 549; 392/441, 444, 449, 451, 454, 458, 459, 460; 374/102

[56] References Cited

U.S. PATENT DOCUMENTS

| | | | |
|---|---|---|---|
| 3,842,241 | 10/1974 | Isaacson et al. | 219/438 |
| 3,890,486 | 6/1975 | Fitzgerald | 219/523 |
| 4,276,466 | 6/1981 | Middleman et al. | 219/523 |
| 4,333,626 | 6/1982 | Holbrook | 392/459 |
| 4,378,488 | 3/1983 | Jager | 219/523 |
| 4,379,220 | 4/1983 | Middleman et al. | 219/523 |
| 4,676,069 | 6/1987 | Miyake | 392/459 |
| 4,852,471 | 8/1989 | Lansing | 219/441 |
| 4,889,973 | 12/1989 | Farinacci et al. | 392/444 |
| 5,057,667 | 10/1991 | Bell et al. | 392/458 |
| 5,113,057 | 5/1992 | Tsai | 219/523 |
| 5,392,380 | 2/1995 | Tsai | 219/523 |
| 5,437,002 | 7/1995 | Bennett | 374/102 |
| 5,465,014 | 11/1995 | Awisati | 219/523 |
| 5,557,704 | 9/1996 | Dennis et al. | 392/458 |
| 5,808,277 | 9/1998 | Dosani et al. | 392/441 |

FOREIGN PATENT DOCUMENTS

| | | | |
|---|---|---|---|
| 3045121A1 | 7/1982 | Germany | 392/451 |
| 62-33256 | 2/1987 | Japan | 392/451 |
| 3-207960 | 9/1991 | Japan | 392/451 |
| 4-177049 | 6/1992 | Japan | 392/451 |

*Primary Examiner*—Tu Ba Hoang
*Assistant Examiner*—Fadi H. Dahbour
*Attorney, Agent, or Firm*—Leydig, Voit & Mayer, Ltd.

[57] ABSTRACT

A heater apparatus includes a flat-shaped heater portion attachable to a vessel such as a water tank, and a controller for controlling the heater portion. The heater portion includes a flat heater, a first temperature sensor for detecting temperature of the flat heater, and a second temperature sensor for detecting temperature of what is contained in the vessel or water tank. The controller keeps the temperature constant inside the vessel in accordance with the temperature detected by the second temperature sensor. If the rate of rise in temperature detected by the first temperature sensor is faster than is deemed normal, the controller stops current flowing to the flat heater.

7 Claims, 3 Drawing Sheets

HEATER APPARATUS FOR AN AQUARIUM

BACKGROUND OF THE INVENTION

1. Field of the Invention

The present invention relates to a heater apparatus that may be attached to a water tank, for example an aquarium or to a vessel for containing liquid, the heater apparatus being arranged so as to keep constant the temperature of water or liquid held inside the tank or vessel.

2. Description of the Related Art

There exist heater apparatuses which have their heating elements attached to an aquarium or to a like vessel in order to heat water inside the tank. This type of heater apparatus includes a temperature sensor that is generally submerged in water inside the tank. In accordance with detected temperatures from the temperature sensor, the heater apparatus controls its heating elements in operation so as to keep constant the water temperature in the water tank.

The temperature sensor is placed, often sheathed, inside the water tank or vessel. In such a state, the sensor comes into contact with what is contained in the water tank or vessel. This raises a possibility that the temperature sensor can be damaged by the contents of the tank. Because impurities can stick to the temperature sensor, users are required to clean and maintain them frequently to ensure accurate temperature control.

The heating elements under control are generally switched on and off depending on the temperature of that which is contained in the water tank or vessel. However, it is the heating elements that are controlled, not the heating itself in a meticulous fashion. As long as there is a sufficient quantity of what is contained in the water tank or vessel, heating control is accurate. But if there is an inordinately reduced quantity of contents or nothing left of the contents inside because of leakage and evaporation, heating cannot be controlled precisely. With little or no liquid in the water tank or vessel, the temperature sensor will detect ambient air temperature. If the detected temperature is lower than a set temperature, the heater apparatus will keep operating its heating elements. Anything that surrounds the heating elements can then be overheated leading to a hazardous situation.

Thermal fuses or thermostats are generally used to prevent heating elements from overheating. However, these protective devices can act only a limited number of times where they are installed. Besides, they add costly chores of inspection and maintenance to users' responsibilities.

SUMMARY OF THE INVENTION

It is therefore an object of the present invention to overcome the above and other deficiencies and disadvantages of the prior art and to provide a heater apparatus which is easy to inspect and maintain and which functions safely if there is an inordinately reduced quantity or nothing left of what is contained in a water tank or vessel to which the apparatus is attached.

In carrying out the invention and according to one aspect thereof, there is provided a heater apparatus comprising a heater portion attachable to an exterior of a vessel or a water tank. The heater portion includes a flat type heater, a first temperature sensor for detecting temperatures of the heater, and a second temperature sensor located away from the heater so as to detect temperatures of the vessel or the water tank.

In a first preferred structure according to the invention, the heater portion may have a flat shape, and the second temperature sensor may be substantially capable of being attached snugly to the vessel or the water tank.

In a second preferred structure according to the invention, the heater apparatus may further comprise a heat insulating material furnished on an apparatus surface opposite to the apparatus surface faced with and attached to the vessel or the water tank.

In a third preferred structure according to the invention, the heater apparatus may further comprise a controller for controlling the heater portion. The controller may include current controlling means for reducing currents flowing to the flat type heater when the temperature detected by the first temperature sensor exceeds an upper limit temperature, the current controlling means further increasing currents flowing to the flat type heater when the temperature detected by the first temperature sensor drops below a lower limit temperature.

In a fourth preferred structure according to the invention, the controller may include temperature rise monitoring means for monitoring a temperature rise time of the first temperature sensor, the temperature rise monitoring means stopping currents flowing to the flat type heater if the time required to reach the upper limit temperature is shorter than a predetermined monitoring time.

In a fifth preferred structure according to the invention, the temperature rise monitoring means may trigger an alarm upon stopping currents flowing to the flat type heater.

These and other objects, features and advantages of the invention will become more apparent upon a reading of the following description and appended drawings.

DETAILED DESCRIPTION OF THE PREFERRED EMBODIMENTS

Preferred embodiments of this invention will now be described with reference to the accompanying drawings.

Figure 1:
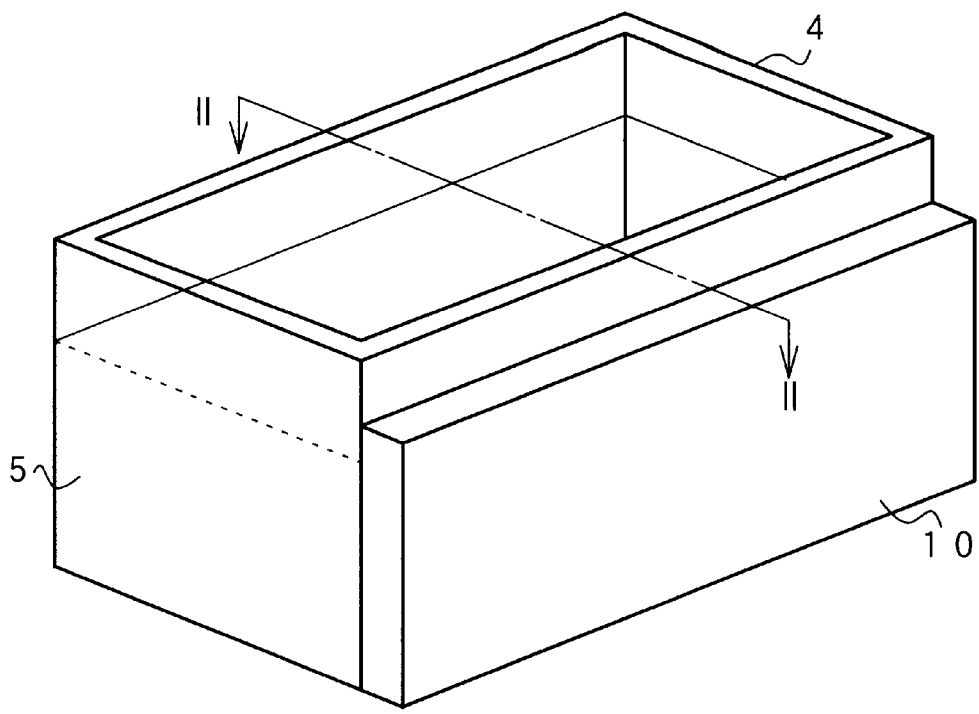
FIG. 1 is a perspective view of a water tank to which a heater apparatus of the invention is attached.

FIG. 1 is a perspective view of a water tank to which a heater apparatus according to the invention is attached. As shown in FIG. 1, a heater portion 10 of the heater apparatus is attached externally to the back of a water tank 4 made illustratively of glass. If the water tank 4 is designed to be an aquarium, sea water or fresh water 5 is to be contained in the tank 4.

Figure 2:
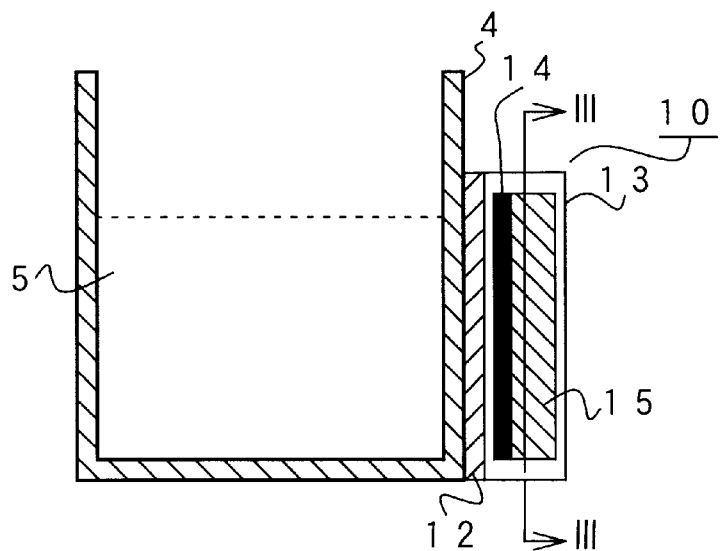
FIG. 2 is a cross-sectional view taken on line II—II in FIG. 1.

FIG. 2 is a cross-sectional view taken on line II—II in FIG. 1. As depicted in FIG. 2, the heater portion 10 is attached to the water tank 4 with an adhesive layer 12 interposed therebetween. The heater portion 10 is enveloped in a cover 13 that contains a flat heater 14 facing the water tank 4. A heat insulating material is installed on that side of the heater portion 10 which is opposite to the water tank 4.

Figure 3:
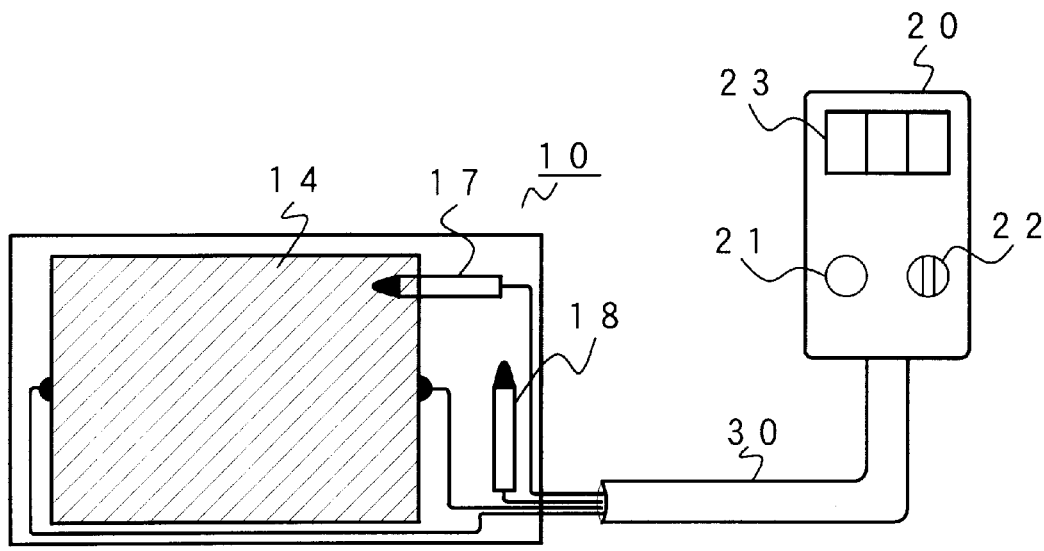
FIG. 3 is a cross-sectional view taken on line III—III in FIG. 2.

FIG. 3 is a cross-sectional view taken on line III—III in FIG. 2. As indicated in FIG. 3, a temperature sensor 17 is located close to the heater 14. Another temperature sensor 18 is positioned away from the heater 14. The temperature sensor 17 measures heat generated by the heater 14, while the temperature sensor 18 detects temperature of the contents in the water tank 4. A controller 20 of the heater apparatus is connected to the heater portion 10 by means of a coupling cable 30. The coupling cable 30 serves at least to transmit detected signals from the temperature sensors 17 and 18 as well as to the controller 20, and to transfer drive signals from the controller 20 to the heater portion 10. As illustrated in FIG. 3, this controller 20 is equipped with an ON/OFF switch 21, a temperature setting dial 22, and a seven-segment LED display unit 23.

Figure 4:
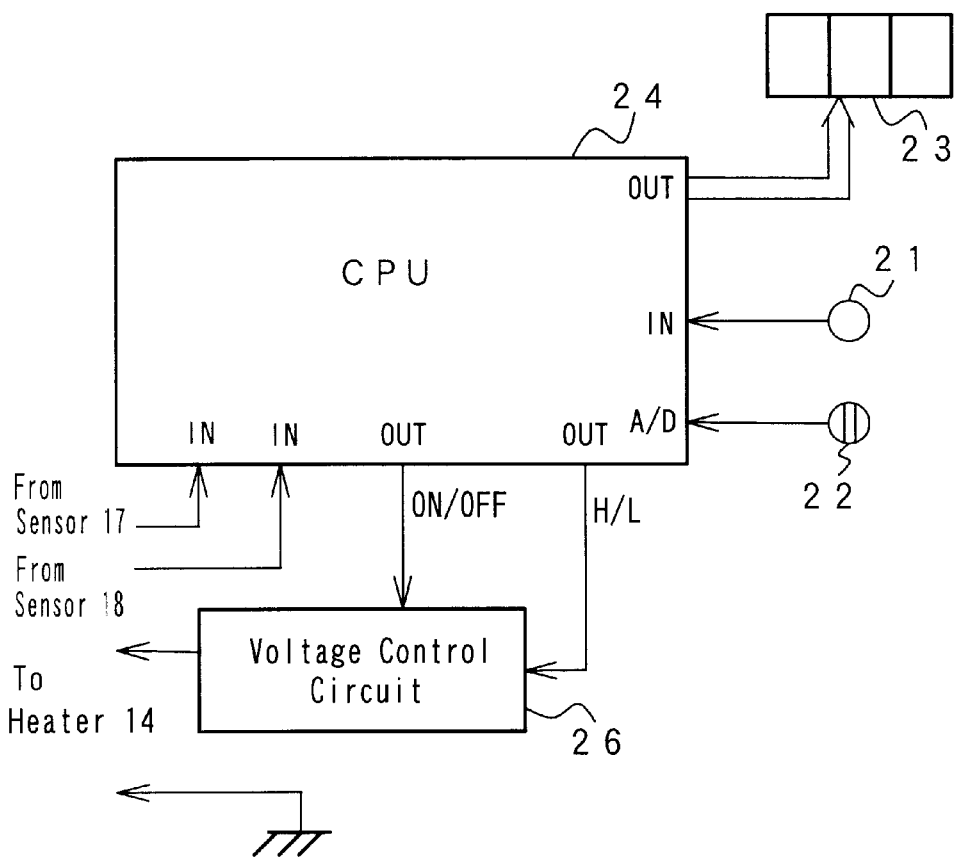
FIG. 4 is a block diagram of a typical controller used by the inventive apparatus.

FIG. 4 is a block diagram showing a typical constitution of the controller 20. This controller 20 has a single-chip CPU 24 that receives information from the ON/OFF switch 21 through an input port and admits information from the temperature setting dial 22 through an A/D conversion input port. A display control signal destined for the display unit 23 is output through an output port. Detected signals from the temperature sensors 17 and 18 are input to the CPU 24 through other input ports, and operation and control signals for the heater 14 are output through other output ports to a voltage control circuit 26. When the operation signal is turned on, the voltage control circuit 26 receiving that ON signal generates accordingly a voltage representing a control signal that is applied to the heater 14 in the heater portion 10.

What follows is a description of how the inventive heater apparatus works.

A user may set a desired water temperature for the water tank 4 by operating the temperature setting dial 22 on the controller 20. The CPU 24 recognizes the temperature set on the temperature setting dial 22 and indicates the set value on the display unit 23. When the user operates the ON/OFF switch 21 to designate the start of a temperature-controlled state, the CPU 24 starts outputting drive signals to control the heater 14 so as to keep to the set temperature value the temperature detected by the temperature sensor 18 in the water tank 4. Thereafter, the display unit 23 indicates temperatures as they are detected by the temperature sensor 18. The user may operate another switch, not shown, to change the set temperature and the detected temperature alternately on the display unit 23.

As shown in FIGS. 1 through 3, the temperature sensor 18 for measuring temperatures inside the water tank 4 is incorporated in the heater portion 10 and, in that setup, attached snugly to an external part of the water tank 4. Located outside the tank, the temperature sensor 18 will not be deteriorated through contact with the contents of the tank 4 and thus need not be frequently inspected and maintained. With the temperature sensor 18 outside the water tank 4, the interior space of the water tank is better utilized than before. Since the heater portion 10 has a flat shape, there is only a very short distance between the temperature sensor 18 and the external surface of the water tank 4. In practical terms, the temperature sensor 18 is stuck snugly to the external surface of the water tank 4 so that the sensor can accurately detect temperatures inside the tank.

How the heater 14 is controlled will now be described.

As shown in FIG. 3, the temperature sensor 17 is located close to the heater 14. This allows the controller 20 immediately to grasp temperatures of the heat being generated by the heater 14. The CPU 24 of the controller 20 controls the heater 14 so that their temperature falls between an upper limit temperature ($\theta_{max}$) and a lower limit temperature ($\theta_{min}$) The two limits may either be set beforehand for the CPU 24 or may be established by the user operating suitable switches on the controller 20. The settings should be such as to ensure efficient heating operation without overheating illustratively, the upper limit temperature is approximately 60° C., preferably about 90 percent of a maximum allowable temperature of the heater 14. The lower limit temperature is illustratively about 55° C.

Figure 5:
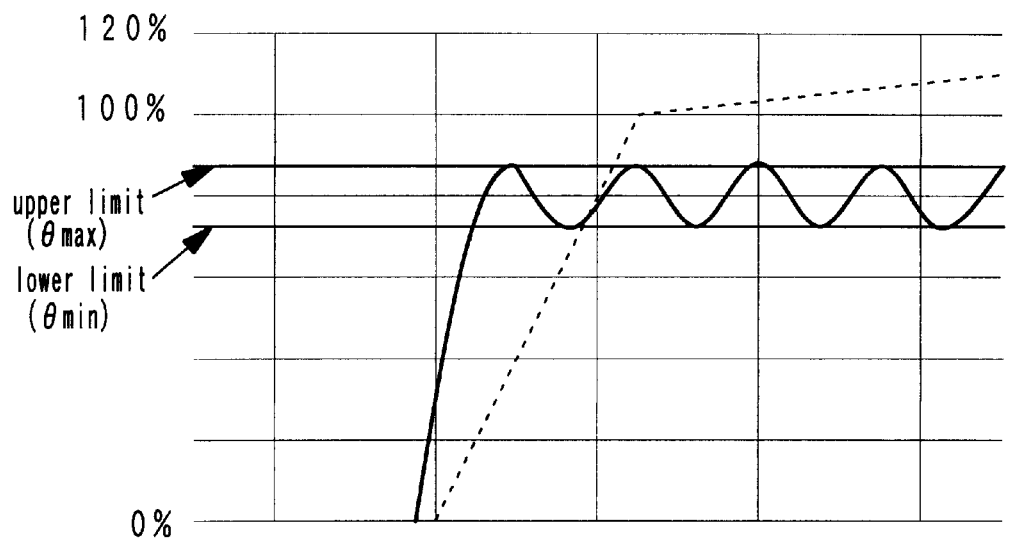
FIG. 5 is a waveform chart illustrating temperature changes of a heater portion used by the inventive apparatus.

As depicted in FIG. 5, when the ON-state operation signal is fed to the voltage control circuit 26 causing the heater 14 to start heating, the heater temperature rises progressively. In this state, the control signal output by the CPU 24 has a High level designating a high voltage. Thus a large current is allowed to flow to the heater 14. In FIG. 5, the temperature at the start of the heating operation is indicated as 0 percent and the maximum allowable temperature of the heater 14 as 100 percent. The CPU 24 brings the control signal Low designating a low voltage upon judging via the temperature sensor 17 that the heater temperature has reached its upper limit. Bringing the control signal Low reduces currents flowing to the heater 14, which lowers the heater temperature. The CPU 24 drives the control signal High designating the high voltage upon judging via the temperature sensor 17 that the heater temperature has dropped to its lower limit. Driving the control signal High increases currents flowing to the heater 14, which raises the heater temperature.

Under such heater control, the heater temperature fluctuates between the upper and the lower limits. While effecting heater control, the CPU 24 may find that a previously set temperature is exceeded by the detected temperature from the temperature sensor 18 detecting temperatures inside the water tank 4. In that case, the CPU 24 halts heater control and turns off the operation signal. This allows the heater temperature to drop, letting the temperature inside the water tank 4 decline. When the temperature sensor 18 detects a temperature dropping below the set temperature, the CPU 24 reactivates the operation signal. When the heater temperature reaches its upper limit, the CPU 24 again controls the heater using the control signal so that the heater temperature falls between the upper and the lower limits.

Figure 6:
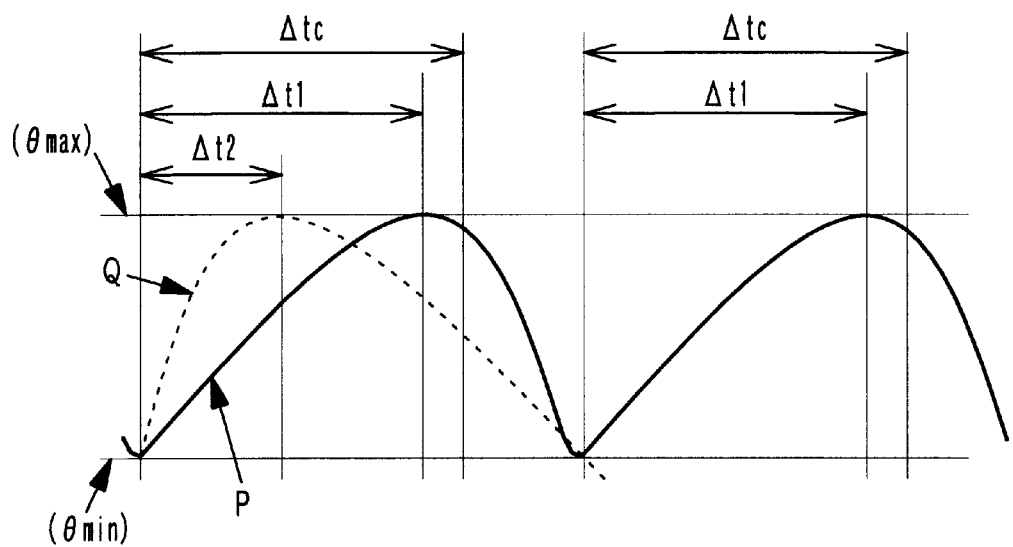
FIG. 6 is an enlarged waveform diagram showing part of FIG. 5.

In addition, the CPU 24 monitors the rate of temperature rise while the heater temperature is fluctuating between the upper and the lower limits. As depicted in FIG. 6, a monitoring time $\Delta tc$ is defined for the purpose of monitoring the temperature rise rate. The monitoring time $\Delta tc$ is set to be slightly longer than the time it takes the heater under a normal load condition to reach the upper limit temperature starting from the lower limit temperature. The normal load condition signifies the presence of at least a predetermined quantity of contents in a water tank 4 matching the size of the heater portion 10, the predetermined quantity being 80 to 90 percent of the tank volume where the user typically uses the water tank 4 as an aquarium. Alternatively, a monitoring time $\Delta t1$ may be set in a variable manner by the user according to the use condition by operation of suitable inputting means furnished on the controller 20.

When at least a predetermined quantity of contents exists in the water tank 4, the time $\Delta t1$ required for the detected temperature from the temperature sensor 17 to rise from the lower limit temperature $\theta_{min}$ to the upper limit temperature $\theta_{max}$ is longer than the monitoring time $\Delta tc$. In other words, the rate of temperature rise is low. As the loads diminish, the time required for the detected temperature to rise from the lower limit $\theta_{min}$ to the upper limit $\theta_{max}$ becomes shorter than the monitoring time $\Delta tc$. That is, the rate of temperature rise becomes progressively high. Decreases in the loads occur illustratively when the sea water or fresh water 5 in the water tank 4 evaporates or leaks out through cracks and fissures that may develop on the tank 4. In FIG. 6, a solid line stands for temperature changes under the normal load condition, and a broken line denotes temperature changes in effect when the loads are reduced. With the loads diminished, the detected temperature reaches the upper limit in a time Δt2 shorter than the monitoring time Δtc as illustrated.

The CPU 24 of the controller 20 admits detected temperatures from the temperature sensor 17 and, using an built-in timer, measures how long it takes for the detected temperature to reach the upper limit starting from the lower limit. When the measured time becomes shorter than the monitoring time Δtc, the CPU 24 turns off the operation signal destined for the voltage control circuit 26. This stops the currents flowing to the heater 14, halting further rise in heater temperature and protecting surroundings of the heater 14 from being overheated. At this point, the CPU 24 may cause the display unit 23 to give an alarm indication. Alternatively, sound generating means such as a buzzer may be provided in the controller 20 to generate an alarm sound.

If the above-described heater control is not carried out, a state of diminishing loads shown by a broken line in FIG. 5 will eventually lead to a heater temperature exceeding the maximum allowable temperature. The result is a dangerous overheat of the surroundings. In particular, a comparable conventional heater apparatus with its heater 14 controlled to heat to close to its maximum allowable temperature will be subject to an even higher heater temperature when the loads become lower than normal. If worst comes to worst, the surroundings can catch fire.

In the examples above, the temperature detected by the temperature sensor 17 was controlled so as to fluctuate between the upper and the lower limits. In effecting such control, the CPU 24 was shown supplying the voltage control circuit 26 with the High or Low control signal to raise or reduce currents flowing to the heater 14. Alternatively, the temperature may be lowered as needed by simply cutting off power to the heater 14. Also in the examples above in which the detected temperature of water from the temperature sensor 18 exceeded the set temperature, the CPU 24 was shown turning off power to the heater 14. Alternatively, the voltage control circuit 26 may be fed with a Low level signal so as to reduce currents flowing to the heater.

The above apparatus embodying the invention was shown using the CPU 24 to constitute current controlling means and temperature rise monitoring means. Alternatively, these means may be implemented by use of other circuit elements such as a combination of discrete ICs or a specialized LSI.

Although the inventive heater apparatus has been described illustratively for use with the water tank 4, this is not limitative of the invention. Alternatively, the heater apparatus of the invention may be used with other vessels and containers to keep their contents heated. In such cases, if there is an inordinately reduced quantity of contents or nothing left inside the tank, currents to the heater 14 are also reduced or turned off to protect the surroundings from getting overheated.

What is claimed is:

1. A heater apparatus attachable to an aquarium, said heater apparatus comprising:
    a heater portion attachable to an exterior of an aquarium, wherein said heater portion contains:
        a flat heater;
        a first temperature sensor located close to said flat heater, said first temperature sensor detecting temperature of said flat heater;
        a second temperature sensor spaced from said flat heater, said second temperature sensor detecting temperature of the aquarium; and
    a controller including:
        current controlling means for turning off said flat heater when a temperature detected by said second temperature sensor exceeds a first temperature, turning on said flat heater when the temperature detected by said second temperature sensor falls below the first temperature, reducing current flow to said flat heater when the temperature detected by said first temperature sensor exceeds an upper limit temperature, and increasing current flow to said flat heater when the temperature detected by said first temperature sensor drops below a lower limit temperature; and
        temperature rise monitoring means for monitoring a temperature rise, within a monitoring time, of the temperature detected by said first temperature sensor, and stopping current flow to said flat heater if the upper limit temperature is reached in less than the monitoring time.

2. The heater apparatus attachable to an aquarium according to claim 1, wherein said heater portion has a flat shape, and wherein said second temperature sensor is attached snugly to the aquarium.

3. The heater apparatus attachable to an aquarium according to claim 2, further comprising a heat insulating material on an apparatus surface opposite to an apparatus surface facing and attached to the aquarium.

4. The heater apparatus attachable to an aquarium according to claim 1, wherein said temperature rise monitoring means triggers an alarm upon stopping current flow to said flat heater.

5. The heater apparatus attachable to an aquarium according to claim 4, wherein said heater portion has a flat shape, and wherein said second temperature sensor is attached snugly to the aquarium.

6. The heater apparatus attachable to an aquarium according to claim 5, further comprising a heat insulating material on an apparatus surface opposite to an apparatus surface facing and attached to the aquarium.

7. The heater apparatus attachable to an aquarium according to claim 1, wherein the aquarium has an opening for receiving a liquid and said heater portion is attachable to a back surface of the aquarium, the back surface forming a right angle with the opening of the aquarium.

* * * * *